May 21 1929.  C. R. KITTLE  1,714,470
JOINTER AND MOLDING MACHINE
Filed Aug. 5, 1927   2-Sheets-Sheet 1
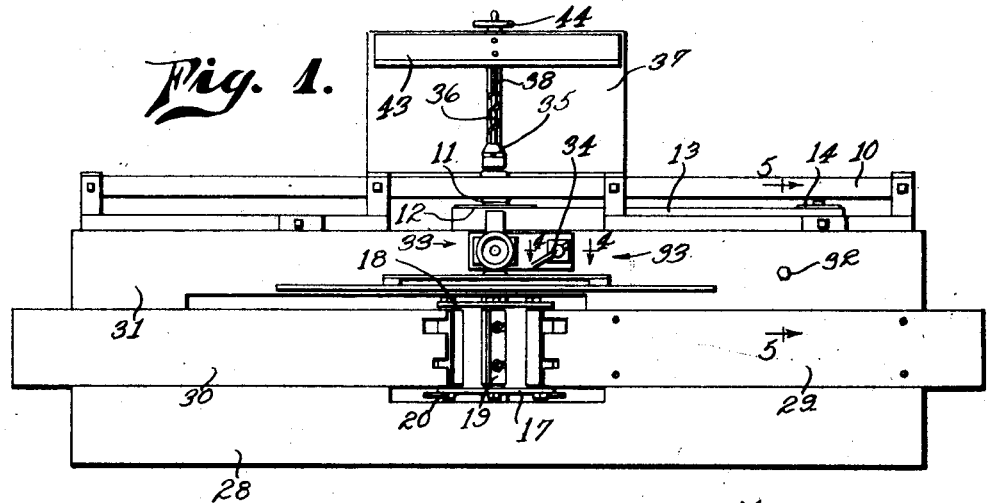
INVENTOR.
Charles R. Kittle;
BY
ATTORNEY.

May 21, 1929.  C. R. KITTLE  1,714,470
JOINTER AND MOLDING MACHINE
Filed Aug. 6, 1927 · 2 Sheets-Sheet 2

INVENTOR.
Charles R. Kittle;
BY
ATTORNEY.

Patented May 21, 1929.

1,714,470

UNITED STATES PATENT OFFICE.

CHARLES R. KITTLE, OF MONROVIA, CALIFORNIA, ASSIGNOR TO ARTHUR E. OVERBURY, OF MONROVIA, CALIFORNIA.

JOINTER AND MOLDING MACHINE.

Application filed August 6, 1927. Serial No. 211,167.

My invention relates to a rotary head on which may be mounted saws and in which are mounted a plurality of adjustable turret heads on and in which are adjustably mounted knives or bits or saws by means of which lumber may be dimensioned and surfaced and grooved for the insertion of guide strips or into moldings; and the object thereof is to provide a compact machine in which tools for doing several different kinds of work are carried, some of the tools being in operative position for doing one kind of work and the other tools being in inoperative position but susceptible of being quickly adjusted to operative position and the former operative tool adjusted to an inoperative position whereby loss of time in removing and replacing tools is eliminated to a large degree.

Figure 6:
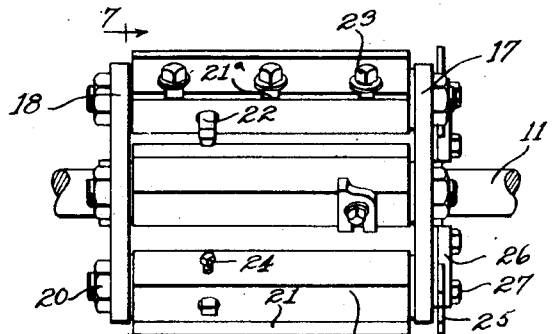
Figure 8:
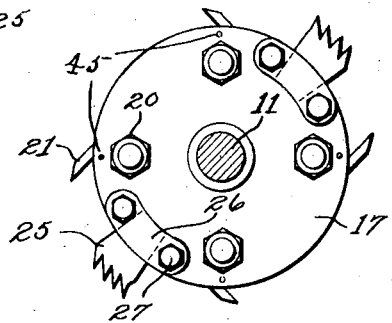
Figure 7:
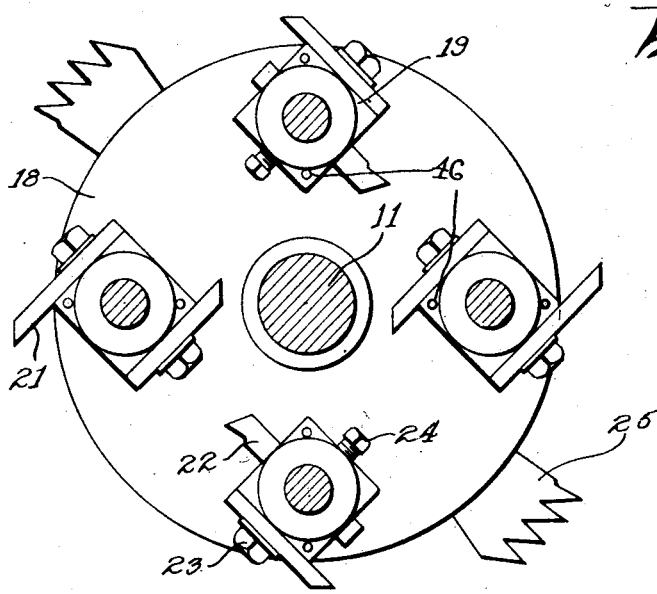

In the drawings forming a part of this application Fig. 1 is top plan of my machine with the adjustable fence longitudinally positioned. Fig. 2 is a top plan of the central portion of the machine with the fence diagonally positioned. Fig. 3 is an end elevation. Fig. 4 is an enlarged view on the line 4—4 of Fig. 1. Fig. 5 is a like section on the line 5—5. Fig. 6 is an enlarged side elevation of the head. Fig. 7 is an enlarged cross section on the line 7—7 of Fig. 6. Fig. 8 is an end view of the saw end of the head.

Referring to the drawings 10 is the frame in which is revolubly mounted the main operating shaft 11 on which is mounted pulley 12 that is driven by belt 13 which runs over pulley 14 on the driving shaft of motor 15 that is mounted on cross member 16 of the frame. On shaft 11 are mounted two disk members 17 and 18 between which members are carried the turret heads 19 of which there are either two or three or a multiple thereof.

In the drawings I have shown four turret heads as in practice I have found that a very satisfactory number. Each turret head is preferably square in cross-section and the outer ends are turned down round and threaded, and when positioned for use the ends project through holes in disks 17 and 18 and have nuts 20 thereon which may be tightened to hold the turret heads positioned to hold the tools carried thereon in an operative or in an inoperative position. On and in the turret heads I mount knives 21 and grooving bits 22. The knives are held positioned on 19 by lag bolts 23 which pass through slots in 21 in the knives. The bits preferably pass through 19 in apertures and are held positioned therein by set screws 24. On the outer face of 17 I mount saws 25 which are held positioned thereon by clamping plates 26 and bolts 27 so that the cutting edge can be adjusted to cut any depth of kerf that may be desired. Like saws could be mounted on 18, if desired. Saws can be mounted on the turret heads if desired. On the top of the vertical members is a table top composed of the rigid member 28 which is cut out adjacent to disk 17 so as not to be interfered with when the disk is operated. At the side of 28 are vertically adjustable members 29 and 30 which have their opposed ends notched for the passage therethrough of such tools as may be secured to the turret heads. It will be understood that the upper surfaces of members 29 and 30 may be adjusted to lie in the same plane or in different planes as desired. Adjacent to 29 and 30 is member 31 which is usually held rigidly mounted as a part of the table top by bolt 32 and plate 32$^a$, which bolt can be loosened and then member 31 can be slid longitudinally of the top. At the side next to 29 and 30 the edge of 31 is cut out so as not to interfere with disk 18 when operated and when 31 is moved longitudinally. An adjustable fence 33 of usual construction is held mounted on 31 by bolt 34 so that the guide face of 33 may be held parallel with the edges of 31 as shown in Fig. 1 or angularly thereto as shown in Fig. 2. Shaft 11 projects through bearings secured to the frame and has a chuck 35 mounted thereon in which such tools as an auger 36 or an emery wheel or a polisher may be secured. A shelf 37 is adjustably mounted on the frame to support the work that is done with the tools in the chuck. A screw 38 is revolubly mounted in bearings 39 and 40. Bearing 39 is supported by brace 41. A follower 42 is threaded upon 38 and projects through a slot in shelf 37. Above shelf 37 the follower has secured thereto an arm 43. A wheel 44 is mounted on screw 38 and when revolved causes the screw to move arm 43 to feed the work to auger 36.

In order to quickly and correctly position the turret heads I provide disks 17 with holes 45 and the turret head with like holes 46 which register with holes 45 when the turret head is in the correct position to render the knife or tool carried thereon operative. A pin 47 which is carried by a chain 48 secured to the frame is passed into holes 46 and 45 and the nuts on the heads are tightened. For distinction I call disks 17 and 18 and the several turret heads carried thereby the operating head. By loosening the nuts on any turret head and turning such turret head an eighth of a revolution from its operative position all knives and tools carried thereby are rendered inoperative. Saws may be mounted on the turret heads. By this construction a compact machine is provided in which tools for doing several different kinds of work are provided some in operative and some in inoperative positions.

Having described my invention I claim:

In a jointer and molding machine an operating head comprising a shaft, two disks mounted therein, said disks having a plurality of turret head perforations near the edges, being two or three in each or a multiple thereof, one of said disks having positioning holes near the other holes, turret heads rotatively mounted in the turret head holes in said disks, each turret head having a positioning hole adapted to register with a disk hole to position the turret head to cause its tool to be carried in an operative position, tools mounted on said turret heads; and means to hold the turret heads so that the tools carried thereby will be in an operative or in an inoperative position.

In witness that I claim the foregoing I have hereunto subscribed my name this 20th day of July 1927.

CHARLES R. KITTLE.